United States Patent Office 3,456,880
Patented July 22, 1969

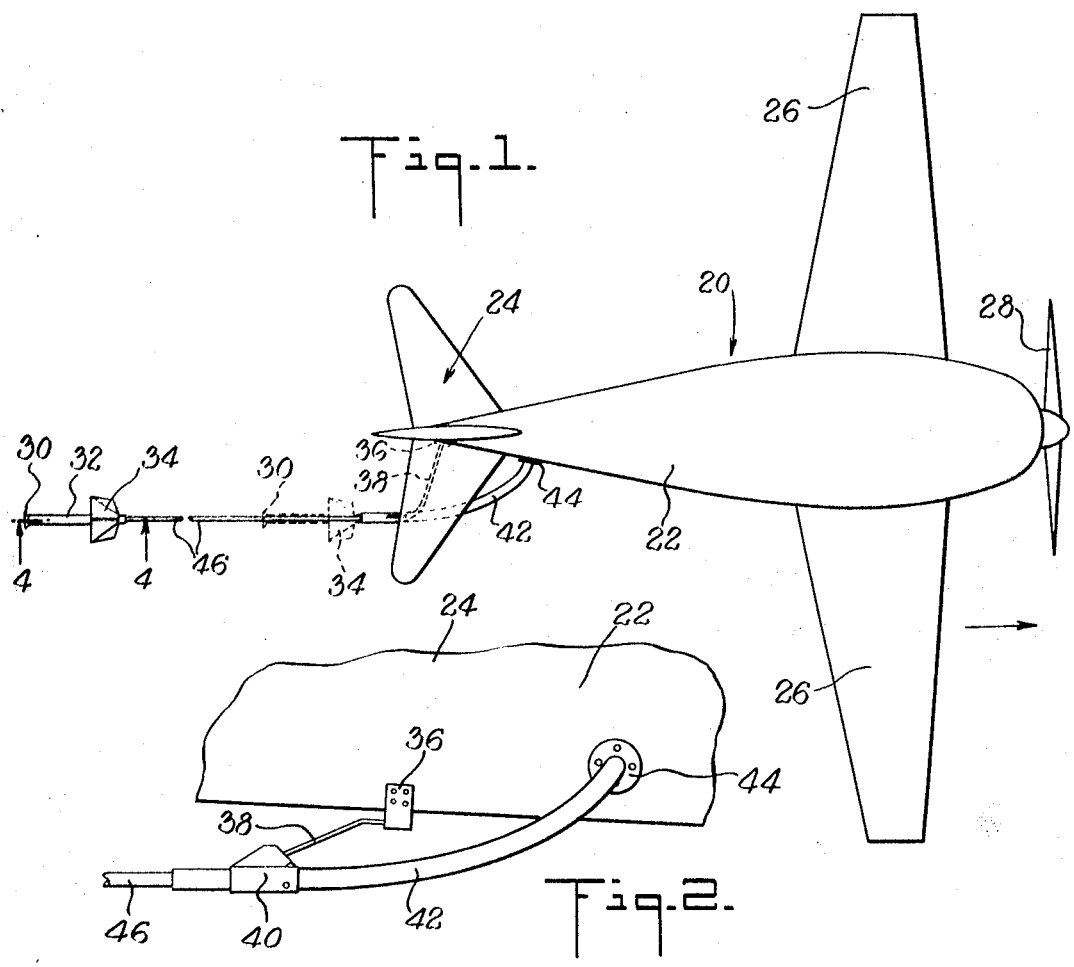
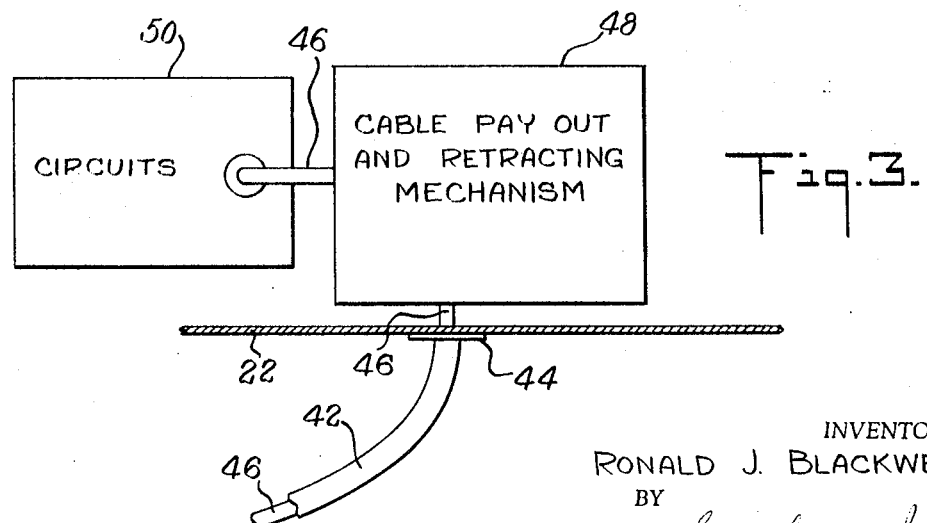

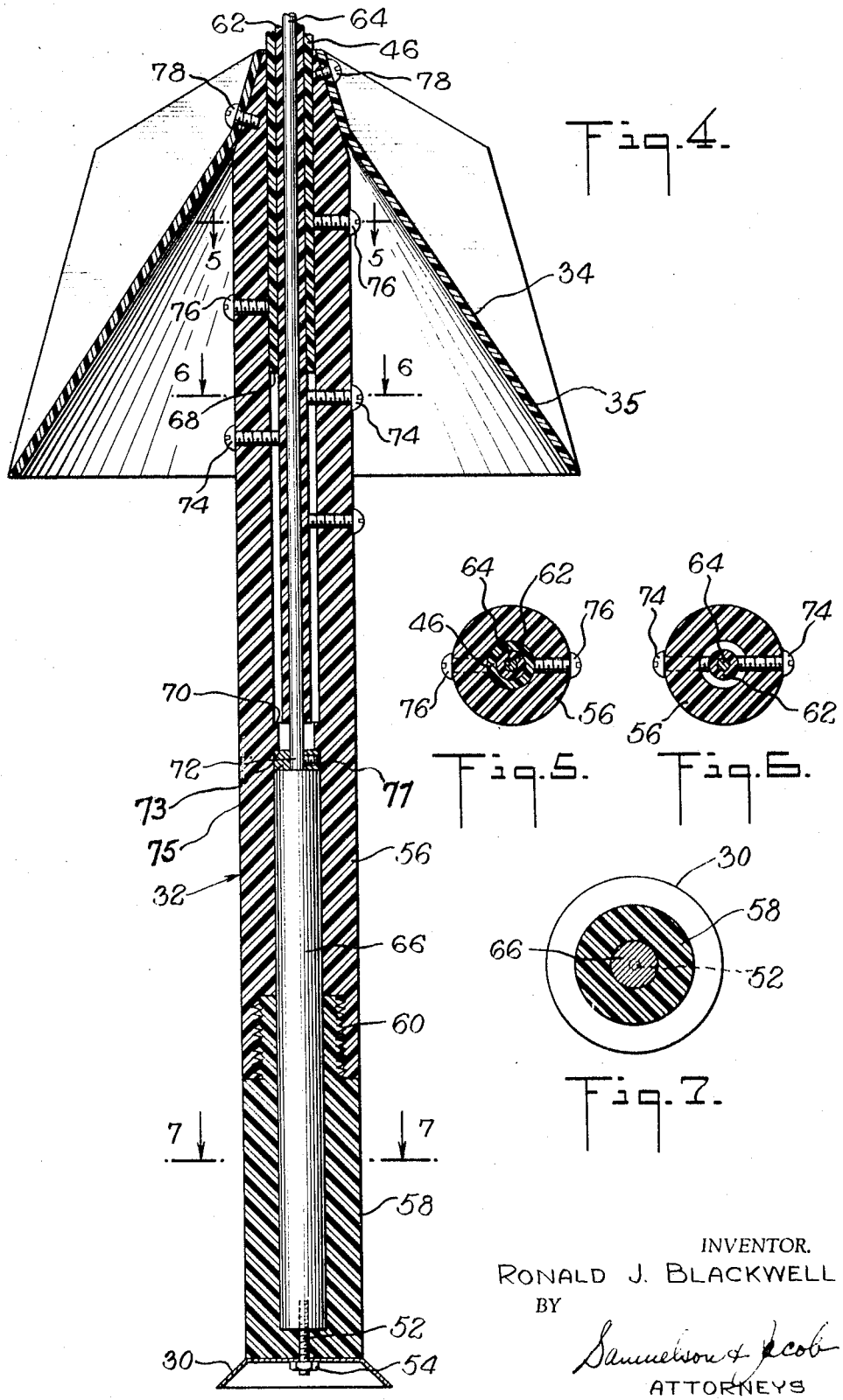

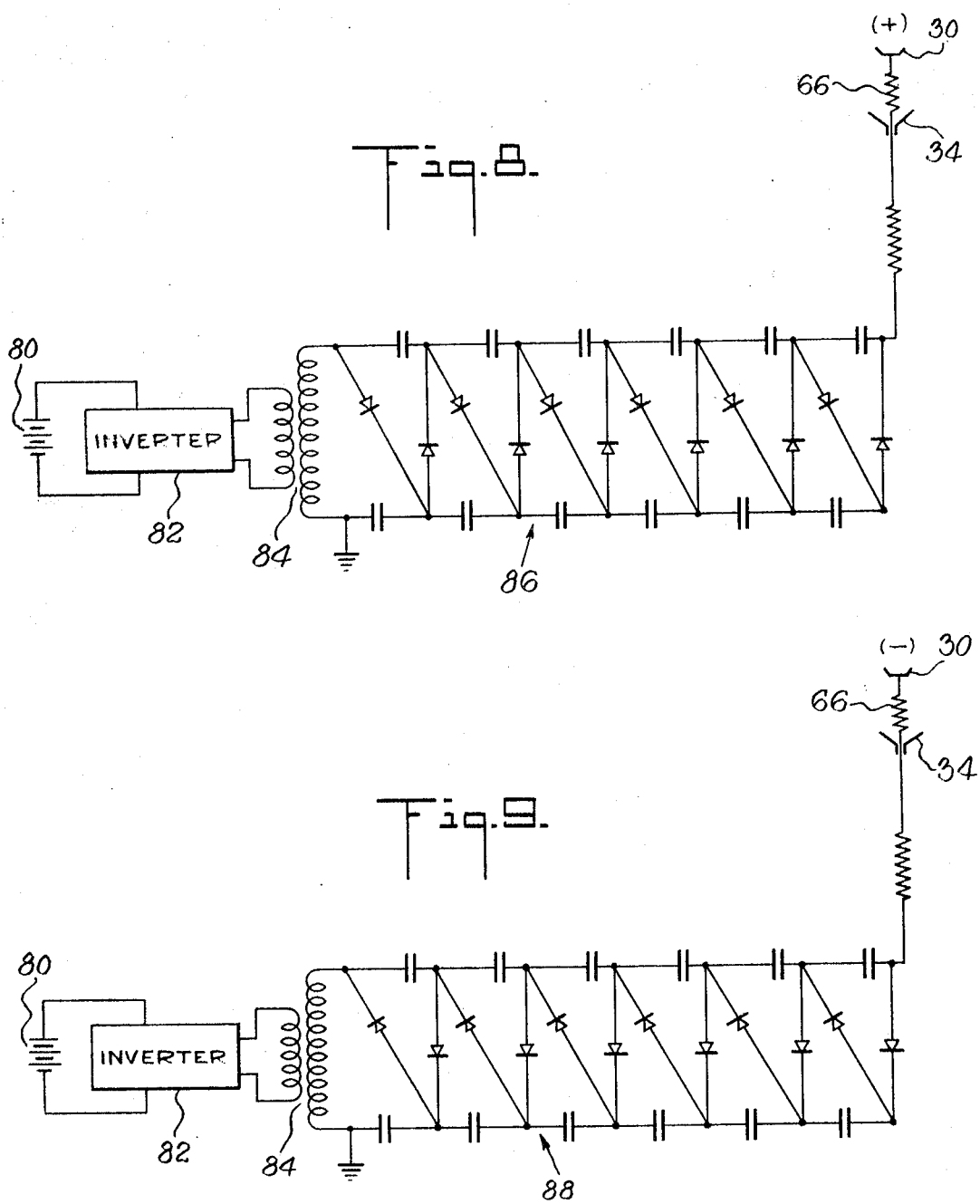

3,456,880
METHOD OF PRODUCING PRECIPITATION FROM THE ATMOSPHERE AND APPARATUS THEREFOR
Ronald J. Blackwell, 537 McKinley St., Passaic, N.J. 07055
Filed Oct. 18, 1966, Ser. No. 587,521
Int. Cl. A01g 15/00; E01h 13/00
U.S. Cl. 239—2     10 Claims

ABSTRACT OF THE DISCLOSURE

A method of inducing precipitation from the atmosphere using an electrode attached to but extended from an aircraft.

The invention relates to a method for producing precipitation from the atmosphere and to apparatus for carrying out the method.

Heretofore, there have been many suggestions made for producing rain in periods of drought and in areas of low annual rainfall. In principle, all of these prior art methods were directed toward agglomerating the moisture in the atmosphere until the droplets became too large and heavy and they dropped as rain. Some of these prior art methods required the clouds in the atmosphere to be seeded with foreign particles such as sand and other granular material. Other methods used electrical charges to cause the charges in the atmosphere to react and to cause the charged particles in the atmosphere to drop as rain. None of these prior art methods were successful and as a result there is still a need for a method which will produce precipitation from the atmosphere when it is required and desired.

Accordingly, it is an important object of the invention to provide a method for causing precipitation from the atmosphere by injecting a charge in the atmosphere from a flying aircraft.

It is a further object of the invention to provide such a method wherein the injection of opposite charges into the atmosphere will cause clouds to form.

It is a still further object of the invention to provide such a method wherein the charging electrode is a sufficient distance from the aircraft that the field between the electrode and the aircraft is minimized and there will be no discharge between the electrode and the aircraft.

It is a still further object of the invention to provide apparatus for carrying out the method.

It is a still further object of the invention to provide such apparatus wherein the electrode may be payed out away from the aircraft for the sufficient distance and may be drawn close to the aircraft when the apparatus is not in use.

It is a still further object of the invention to provide such apparatus which is simple and economical to construct and operate.

These and other objects, advantages, features and uses will be apparent during the course of the following description, when taken in connection with the accompanying drawings, wherein:

FIGURE 1 is a plan view of an airplane used with the apparatus of the invention and to carry out the method of the invention, showing the electrode in its extended position in solid lines and in its retracted position in the dotted lines;

FIGURE 2 is an elevational view showing the means for mounting the apparatus to the aircraft in detail;

FIGURE 3 is a block diagram of the apparatus of the invention;

FIGURE 4 is an enlarged, sectional view taken along the lines 4—4 of FIGURE 1, viewed in the direction of the arrows;

FIGURE 5 is a sectional view taken along the lines 5—5 of FIGURE 4, viewed in the direction of the arrows;

FIGURE 6 is a sectional view taken along the lines 6—6 of FIGURE 4, viewed in the direction of the arrows;

FIGURE 7 is a sectional view taken along the lines 7—7 of FIGURE 4, viewed in the direction of the arrows;

FIGURE 8 is a schematic diagram of the electrical circuit used to apply a positive charge to the electrode; and FIGURE 9 is a schematic diagram of the electrical circuit used to apply a negative charge to the electrode.

In the drawings, wherein, for the purpose of illustration, is shown a preferred embodiment of apparatus of the invention, the numeral 20 designates the aircraft which is used to carry the apparatus of the invention and to carry out the method of the invention. Airplane 20 is seen to comprise fuselage 22, tail section 24, wings 26 and propeller 28 and flies in the direction of the arrow of FIGURE 1. Other types of aircraft may be used but it is necessary that they fly so that the electrode of the invention extends away from the direction of flight.

Electrode 30 is mounted at one of hollow, cylindrical, insulated, housing 32, preferably as shown in FIGURE 4. Open, tapered, baffle 34, which is preferably finned as at 35 to prevent twisting (FIGURES 1 and 4), is formed of insulating material, is positioned at the end of the insulated housing opposite the electrode and serves to prevent the accumulation of moisture on the cylindrical housing. The apparatus is mounted to the airplane by means of plate 36 which is affixed to the tail section of the aircraft, support arm 38 and hollow, cylindrical support 40. Hollow, plastic guide 42 is affixed to hollow, cylindrical, support 40 and to fitting 44 which is affixed to the fuselage 22 of the aircraft 20. Sheath 46 is formed of plastic, insulating material and is payed out from inside the airplane through guide 42 and support 40. It is retracted into the craft through the same elements.

Circuits 50 and cable pay out and retracting mechanism 48 are mounted inside the airplane. The mechanism 48 may be operated by hand or by motor in any manner known in the art (details not shown). Circuits 50 deliver a high, direct-current voltage to the electrode as will be described further on in this specification.

Electrode 30 (FIGURE 4) is preferably formed in the shape of a small, flat, metallic dish so that a maximum amount of charge is transmitted to the atmosphere. It is assembled on the end of hollow, cylindrical, insulated housing 32 by means of stud 52 and nut 54.

Housing 32 is made up of two sections 56 and 58 which thread together at 60. To assemble the housing so that connection is made to the electrode, the end 72 of electrical conductor 64 is bared as shown and wire 64 with its surrounding insulator 62 is slid into portion 56 of housing 32.

End 72 of wire 64 is pulled through beyond the end of section 56 and washer 75 is affixed to end 72 by means of screw 77. Now, the wire is pulled back into section 56 until washer 75 rests snugly against ledge 73. Then, screws 74 are tightened so that the wire and its covering are held in place. Next, sheath 46 is slid into place over the wire and its covering until its end rests against ledge 68 and screws 76 are tightened so that it is also held in place inside the housing. Now, stud 52 is inserted in one end of resistor 66 and the resistor is placed in portion 58 so that stud 52 protrudes from portion 58. Portion 58 is now threaded into portion 56 so that stud 52 protrudes from portion 58 and resistor 66 makes electrical connection with bared portion 72 of wire 64.

Next, tapered baffle 34 is slid over housing 32 and is attached to it by means of screws 78. Now electrode 30 is affixed to the housing by means of nut 54 on stud 52 so that electrical connection is made between resistor 66 and electrode 30 by means of stud 52. FIGURE 8 illustrates a preferred electrical circuit for delivering a positive charge to electrode 30. Battery 80 is connected to inverter 82, which may be of any standard type capable of delivering alternating-current voltage of about 115 volts. The output of inverter 82 is connected to transformer 84 which delivers a high voltage output of the order of 10,000 volts to rectifier network 86. The output of the rectifier network is positive with respect to equipment ground (the aircraft).

The circuit of FIGURE 9 delivers a negative charge to electrode 30 with respect to equipment ground (the aircraft). Inverter 82 converts the direct current from battery 80 to alternating current which is fed to the primary of transformer 84. The output of transformer is fed to rectifier network 88 and a negative charge appears on electrode 30. Since the operation of rectifier networks 86 and 88 are readily understood from the drawings, the detailed discussion of the function of their various elements is omitted.

I have found that the voltage applied from the rectifier network should be of the order of from 25 kilovolts and up. The voltage is essentially linear with altitude in that the method will produce precipitation at 2500 feet with a voltage of 25 kilovolts and at 25,000 feet with a voltage of 250 kilovolts. The value of resistor 66 follows the same linear relationship and should have a value of about 3 megohms at 125 kilovolts and about 14 megohms at 250 kilovolts.

The distance between the electrode and the aircraft during operation should be sufficient so that there is no discharge from the electrode to the plane. At 125 kilovolts, I have found that 15 feet was an adequate distance. In operation in an area of the atmosphere containing natural clouds, use of a single charge is sufficient to cause precipitation and rain. The selection of the polarity of the charge depends upon the nature of the charge in the atmosphere and selection of the appropriate charge is determined by trying one polarity, observing the results and then trying the other polarity and observing the results. If there are no clouds in the area, clouds may be formed by successively injecting positive and negative charges into the atmosphere and then applying the proper precipitation charge. The dual, opposite charges may be applied successively or simultaneously.

Operation proceeds as follows: the apparatus is placed in its retracted position and the aircraft takes off. When flying altitude is reached, the electrode is payed out and when it reaches its extended position, the voltage is applied. The aircraft now flies back and forth across the desired area of the atmosphere and charges the water droplets, water nuclei and/or the like, in the air until they become too heavy and drop to the ground as rain. It should also be noted that the method of the invention works better at the lower air temperatures.

As various changes could be made in the above described method and apparatus without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. The method of producing precipitation from the atmosphere which comprises:
introducing a high voltage charge into the atmosphere from an electrode extending from a flying aircraft; the electrode being extended outward a sufficient distance from the flying aircraft such that the electric field between the electrode and the flying aircraft is minimized and there will be no discharge between the electrode and the flying aircraft.

2. The method of claim 1 wherein the high voltage charge is positive.

3. The method of claim 1 wherein the high voltage charge is negative.

4. The method of claim 1 wherein two such high voltage charges are introduced into the atmosphere, one of the high voltage charges being positive and the other of the high voltage charges being negative.

5. Apparatus for producing precipitation from the atmosphere which comprises:
a flying aircraft;
means mounted in the flying aircraft for generating a high, direct-current, voltage;
an electrode, which is electrically conductive, connected to the means for generating a high, direct-current, voltage;
means for extending the electrode a sufficient distance outward from the flying aircraft such that the electric field between the electrode and the flying aircraft is minimized and there will be no discharge from the electrode to the aircraft.

6. The apparatus of claim 5 wherein the electrode is mounted on an assembly, the assembly comprising:
a hollow, cylindrical, insulated, housing;
the electrode being affixed external of the hollow, cylindrical, insulated housing at one end thereof;
a cylindrical resistor within the hollow, cylindrical, insulated, housing electrically connected at one end thereof to the electrode;
means for connecting the other end of the cylindrical resistor to the means for generating a high, direct-current, voltage.

7. The apparatus of claim 6 wherein the means for connecting the other end of the cylindrical resistor to the means for generating a high, direct-current, voltage is a conductive wire and including a flexible, insulating, covering affixed to the wire.

8. The apparatus of claim 7 including an outer, insulating, flexible sheath surrounding the flexible, insulating, covering and affixed to the hollow, cylindrical, insulated, housing and to the aircraft so as to permit the hollow, cylindrical, insulated housing to be extended outward from the aircraft by paying out the outer, insulating, flexible, sheath and to be drawn close to the aircraft by retracting the outer, insulating, flexible, sheath.

9. The apparatus of claim 8 including a tapered baffle having its smaller end affixed to the hollow, cylindrical insulated, housing at the end opposite to that to which the electrode is affixed and flaring outwardly toward the electrode so as to surround a portion of the hollow, cylindrical, insulated, housing.

10. The apparatus of claim 9 wherein the tapered baffle has at least one external fin to prevent twisting of the assembly.

References Cited

UNITED STATES PATENTS

| | | | |
|---|---|---|---|
| 803,180 | 10/1905 | Lodge | 239—14 |
| 1,284,982 | 11/1918 | Balsillie | 239—14 |
| 3,019,989 | 2/1962 | Vonnegut | 239—2 |
| 1,279,823 | 9/1918 | Balsillie | 239—2 X |
| 1,356,484 | 10/1920 | Boltas | 317—262 X |
| 1,928,963 | 10/1933 | Chaffee | 239—2 |
| 2,432,371 | 12/1947 | Berberich. | |

OTHER REFERENCES

Popular Mechanics, March 1959, vol. III #3, pp. 81, 82, 83, 84, 85, 252, 254, 256, High Voltage Rainmakers, by R. F. Dempewolff.

EVERETT W. KIRBY, Primary Examiner

U.S. Cl. X.R.

239—14